Patented Sept. 20, 1932

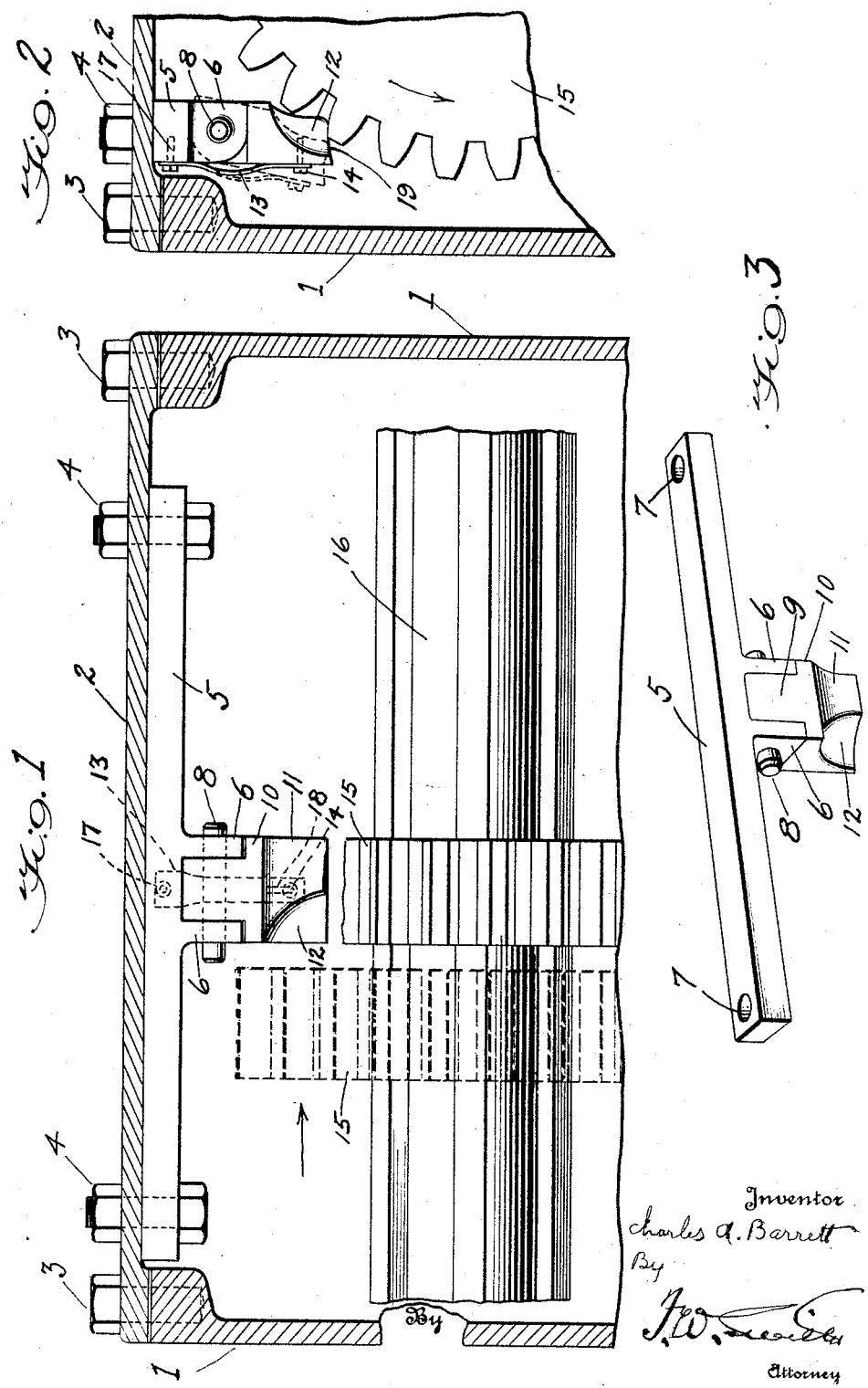

1,877,789

UNITED STATES PATENT OFFICE

CHARLES A. BARRETT, OF BRIDGEPORT, CONNECTICUT

AUTOMOBILE STOP

Application filed July 8, 1931. Serial No. 549,362.

This invention relates to improvements in automobile retarders, or devices for preventing automobiles from rolling backward independent of the brakes and clutch.

An object of this invention is to provide a device for preventing automobiles from rolling backward down hill independent of the brakes and clutch, when for any reason the car has to stop while traveling up hill, and for holding it in a steady position, but at the same time allowing the car to proceed forward with the same ease of control as on the level ground.

Other objects of this invention will appear from the following detailed description of the device, and as disclosed in the single sheet of drawings herewith made a part of this application.

In the drawing,

Figure 1 is a side elevational view of the device showing the first speed gear in the position of idleness, and also in the shifted position for engaging the stop at first speed—

Figure 2 is a front elevational view of the device, illustrating the position of the stop or retarder after it has become engaged with the first speed gear—

Figure 3 is a perspective view of the device detached from the transmission cover.

Numeral 1 designates the transmission housing, having a cover 2 secured thereto by suitable machine screws 3. The retarding device is preferably formed by having a bracket portion 5 adapted to be detachably fastened to the cover 2 by means of machine bolts 4 passing through openings 7 in the bracket 5. Spaced lug portions 6 extend downwardly from the bracket member 5 for receiving a locking lever 9 pivotally mounted therebetween as at 8. Shoulder portions 10 extend outwardly at the sides of the locking lever 9 for abutting the lower edges of the lugs 6, thereby limiting the movement of the locking lever 9. The lower portion of the locking lever 9 is formed with specially shaped notches or bevels 11 and 12, for engaging the teeth of the first speed gear 15, as clearly shown in Figure 2. A spring 13 is fastened at its upper end to the bracket 5, by means of a screw 17, and is adjustably and operatively connected at its lower end to the locking lever 9 by means of a screw 14 extending through a slot 18 in the spring 13, thereby preventing the locking lever 9 from flapping, and at the same time making it possible to hold the spring and locking lever together resiliently.

In operation as the first speed gear 15 slides on the main transmission shaft 16 toward the position shown, one of the teeth of the gear will engage the notch or bevel 12 of the locking lever 9 forcing it rearwardly against the resiliency of the spring member 13, as clearly shown in Figure 2. It is apparent that the engagement of a tooth of the first speed gear while constantly rotating in a forward motion shown by the arrow in Figure 2, will throw the locking lever rearward against the resiliency of the spring 13, as disclosed in dotted lines, but instantly after the gear ceases to revolve, the locking lever 9 will spring back and its curved undersurface 19 will engage against the side of the tooth which had previously thrown the lever rearwardly. It is obvious that if the engine continues to operate the gear 15, and does not stop, the teeth of the gear will merely cause the lever 9 to keep on flapping back and forth until the gear is released or thrown off first speed position. Now, if for any reason the car comes to a stop, the curved portion of the locking lever 19 will engage the tooth as shown in Figure 2, and the gear will not be allowed to revolve backward, thereby preventing the car from rolling down hill.

It will be understood that many changes and modifications may be made in the form of the embodiment of the invention within the scope of the following claims without departing from the spirit of the invention.

What I claim is:—

1. A retarder for connection with the transmission housing of an automobile having a first speed gear and shaft therein, comprising a bracket member on the housing, a locking lever pivotally swung from said bracket and provided with adjacent cut away portions for gear contact, the locking lever being arranged to flap back and forth during the forward movement of the gear, but adapted to lock the gear from backward motion in the event of the automobile coming to a stop for any reason, thereby preventing the automobile from rolling backward.

2. In combination with the transmission housing of an automobile according to claim 1, spring means for causing the locking lever to be quickly flapped back to its first position after being forced rearwardly against the resiliency of the spring during the forward motion of the gear.

In testimony whereof I affix my signature hereto.

CHARLES A. BARRETT.